(12) United States Patent  
Collins

(10) Patent No.: US 6,444,129 B1
(45) Date of Patent: Sep. 3, 2002

(54) TIMING OF SPA WATER TREATMENT

(75) Inventor: Jeffrey W. Collins, Chatsworth, CA (US)

(73) Assignee: Softub, Inc., Chatsworth, CA (US)

( * ) Notice: Subject to any disclaimer, the term of this patent is extended or adjusted under 35 U.S.C. 154(b) by 0 days.

(21) Appl. No.: 09/780,111

(22) Filed: Feb. 9, 2001

(51) Int. Cl.[7] .................................................. C02F 1/00
(52) U.S. Cl. ........................ 210/739; 210/764; 210/765; 210/138; 210/167
(58) Field of Search .................................. 210/739, 742, 210/764, 765, 138, 143, 167, 169, 194, 416.2

(56) References Cited

U.S. PATENT DOCUMENTS

| | | | |
|---|---|---|---|
| 3,672,508 A | * | 6/1972 | Simon |
| 4,322,297 A | * | 3/1982 | Bajka |
| 4,533,476 A | | 8/1985 | Watkins |
| 4,780,197 A | | 10/1988 | Schuman |
| 5,361,215 A | | 11/1994 | Tompkins et al. |
| 5,422,014 A | | 6/1995 | Allen et al. |
| 5,559,720 A | | 9/1996 | Tompkins et al. |
| 5,585,025 A | | 12/1996 | Idland |
| 5,885,426 A | | 3/1999 | Silveri |
| 5,930,852 A | | 8/1999 | Gravatt et al. |
| 5,932,127 A | | 8/1999 | Maddox |
| 5,976,385 A | | 11/1999 | King |
| 5,980,752 A | | 11/1999 | Bowers |
| 5,985,155 A | | 11/1999 | Maitland |
| 6,007,693 A | | 12/1999 | Silveri |
| 6,019,893 A | | 2/2000 | Denkewicz, Jr. et al. |
| 6,066,253 A | | 5/2000 | Idland et al. |
| 6,079,950 A | | 6/2000 | Seneff |

* cited by examiner

Primary Examiner—Betsey Morrison Hoey
(74) Attorney, Agent, or Firm—William W. Haefliger

(57) ABSTRACT

A method of controlling the operation of a spa water treating system, where such treating is selected from the group:
  iv) water filtration
  v) water sanitizing
  vi) water heating
and that includes the steps:
  a) determining a desired water treating time interval as a function of timing of spa water prior treating interval, or usage,
  b) and treating the spa water as a function of said determined time interval.

10 Claims, 5 Drawing Sheets

FIG. 4a.

WARM WEATHER (summertime)

Day 1
12:00 AM           4:00 AM          8:00 AM                              12:00 PM
15 min. filtration (12:15 am - ll:59 am No Heat Call /Demand)   15 min. filtration Day 2
12:00 AM           4:00 AM          8:00 am                              12:00 PM
15 min. filtration (12:15 am -11:59 am No Heat Call/Demand)    15 min. filtration Day 3
12:00 AM           4:00 AM          8:00 AM                              12:00 PM
15 min. filtration (12:15 am - 11:59 am No Heat Call/Demand)   15 min. filtration Day 4
12:00 AM           4:00 AM          8:00 AM                              12:00 PM
No filtration      (12:15 am -11:59 am No Heat Call/Demand)    15 min. filtration In the above scenario, the filter cycle ran completely for the first 2 days,

COOLER WEATHER (wintertime)

Day 1
12:00 AM           4:00 AM          8:00 AM                              12:00 PM
15 min. filtration (12:15 am - 11:59 am Heat Call for 1 hour)  No filtration Day 2
12:00 AM           4:00 AM          8:00 AM                              12:00 PM
No filtration      (12:15 am - 11:59 am Heat Call for 45 minutes) No filtration Day 3
12:00 AM           4:00 AM          8:00 AM                              12:00 PM
No filtration      (12:15 am - 11:59 am No Heat Call/Demand)   15 min. filtration Day 4
12:00 AM           4:00 AM          8:00 AM                              12:00 PM
No filtration      (12:15 am - 11:59 am Heat Call for 45 minutes) No filtration In the above scenario, the filter cycle was bypassed completely for the first 2 days,

FIG. 9b.

4:00 PM          8:00 PM          (12 am next day)
(12:15 pm - 11:59 pm No Heat Call/Demand)    (15 min. filtration)

4:00 PM          8:00 PM          (12:00 am next day)
(12:15 pm - 11:59 pm No Heat Call/Demand)    (15 min. filtration)

4:00 PM          8:00 PM          (12:00 am next day)
(12:15 pm - 11:59 pm heat call for 45 minutes)    (No filtration)

4:00 PM          8:00 PM          (12:00 am next day)
(12:15 pm -11:59 pm No Heat Call/Demand)    (15 min. filtration)

then was skipped on the 3rd day and ran on the 4th day

4:00 PM          8:00 PM          (12:00 am next day)
(12:15 pm - 11:59 pm Heat Call for 45 minutes)    (No filtration)

4:00 PM          8:00 PM          (12:00 am next day)
(12:15 pm - 11:59 pm Heat Call for 45 minutes)    (No filtration)

4:00 PM          8:00 PM          (12:00 am next day)
(12:15 pm - 11:59 pm Heat call for 45 minutes)    (No filtration)

4:00 PM          8:00 PM          (12:00 am next day)
(12:15 pm - 11:59 pm Heat Call for 45 minutes)    (No filtration)

then was run on the 3rd day and skipped on the 4th day

TIMING OF SPA WATER TREATMENT

BACKGROUND OF THE INVENTION

This invention relates generally to hot tub or spa water treatment, and more particularly to time related control of such treatment.

Prior spa controls operate to circulate water, to heat water and to filter the water. A spa user manually activates the spa control or controls, turning it on for use and then turning it off.

Spas typically operate thermostatically, in the sense that the temperature is "set" and the spa operates to maintain that temperature. The spa user can "set" a filter cycle i.e. pre-programmed times or times when the spa will operate in order to filter the water. This allows the water to be circulated and run through the equipment's filtration apparatus, so that the water is filtered or "turned over", meaning that all water is run through the filter. This helps to keep the water clean, prevents algae formation and circulates whatever sanitizer is being employed, to kill bacteria in the tub.

At the present time, all three of these functions operate independently of each other. The spa runs to maintain temperature, the spa owner can use the spa as he pleases, and the filter cycles turn on automatically at their pre-programmed or pre-set times. If the spa or tub should run for 1 hour a day to keep the water clean, the filter cycles are set for one hour per day in order to keep the water clean and clear. Dependent on the outside ambient temperature, the spa could satisfactorily operate for no time in the hot summer, or for 24 hours a day in the winter, to maintain temperature. The filter operates during such heating cycles, because the filter is connected to the main pump and heater.

There is need to provide for more efficient spa or tub operation, for example to reduce consumption of power needed to operate pumps, and without compromising efficient water filtering or sanitizing, or water heating.

SUMMARY OF THE INVENTION

It is a major object of the invention to provide apparatus and methods of operation which will meet the above, as well as other needs, as will appear. Basically, the invention concerns a novel combination of steps of operation, employing timed control of spa water pumping, water filtering and/or water sanitizing.

The invention recognizes and concerns, for example, the following type situation:

If the spa only needs to run for 1 hour to keep the water clean and filtered, any operation over the 1 hour is not necessary to keep the water clean. If a tub runs for 2 hours to maintain the water set temperature, certain pre-set or pre-programmed filter cycles are not necessary, and are a waste of energy. The present invention enables a comparison of the total run time of the spa in between filter cycles with a selected parameter such as a desired filter cycle. If, in a 12 hour period between filter cycles, the tub does not run for a heat call, the filter cycle will run as it should. If the tub runs in order to maintain heat, the amount of time the tub has run is compared to the desired filter cycle, and a portion of the filter cycle is eliminated if sufficient filtering has occurred during heating. Accordingly, the tub operation will not waste energy to filter and clean the water, if the spa already has run for enough time to keep the water clean. These concepts are applicable to an enclosed body of water that is filtered and either heated, sanitized, run for therapy or display, with the filtration equipment connected to the pump being run. Examples are spas, hot tubs, pools, ponds, fountains, etc.

The program that determines the required filtration time of the tub varies with the size of the tub, usage, number of jets, size of filter, sanitizer being used, etc. and can be set or selected as by trial and error or calculated by comparison methods, knowing the desired objectives. Additionally, whether the filter cycle is completely turned off or calculated to the actual difference in time between the programmed filter time and the actual amount of time the tub ran (i.e. 60 minutes desired filter cycle−45 minutes heating=15 minutes left) is of lesser consequence. The concepts of comparing and contrasting these operations or actions in order to increase energy efficiency, reduce unnecessary wear on equipment, extend the life of the filter and seal, and numerous other benefits are of importance to the invention.

Accordingly, it is a major object of the invention to provide a method of controlling the operation of a spa water treating system, where such treating is selected from the group:

i) water filtration
ii) water sanitizing
iii) water heating and that includes the steps a) determining a desired water treating time interval as a function of timing of spa water prior treating interval, or usage,
b) and treating the spa water for that determined time interval.

Such treating may comprise water filtration, sanitizing, or heating, or combinations of these. Also, the timing of spa water prior treating interval is the time duration of such treating.

Yet another object is to provide a method of reducing pump water energy requirement, in a spa water circulation system, wherein the water pump is programmed to operate during timewise spaced cyclic intervals $A_1$ and $A_2$ to effect water filtration by a filter during such intervals, and wherein a water heater is operable for a time interval B to heat the water being circulated and filtered and in response to a drop in spa water temperature, the steps that include a) determining said intervals $A_1$, $A_2$, and $B_1$ and
b) reducing or eliminating said cyclic interval $A_2$ as a function of duration of said time interval B.

These and other objects and advantages of the invention, as well as the details of an illustrative embodiment, will be more fully understood from the following specification and drawings, in which:

DRAWING DESCRIPTION

FIG. 4a is a time cycle example description;

FIG. 4b is a view of the lower portion of the apparatus, and

DETAILED DESCRIPTION

Figure 1:
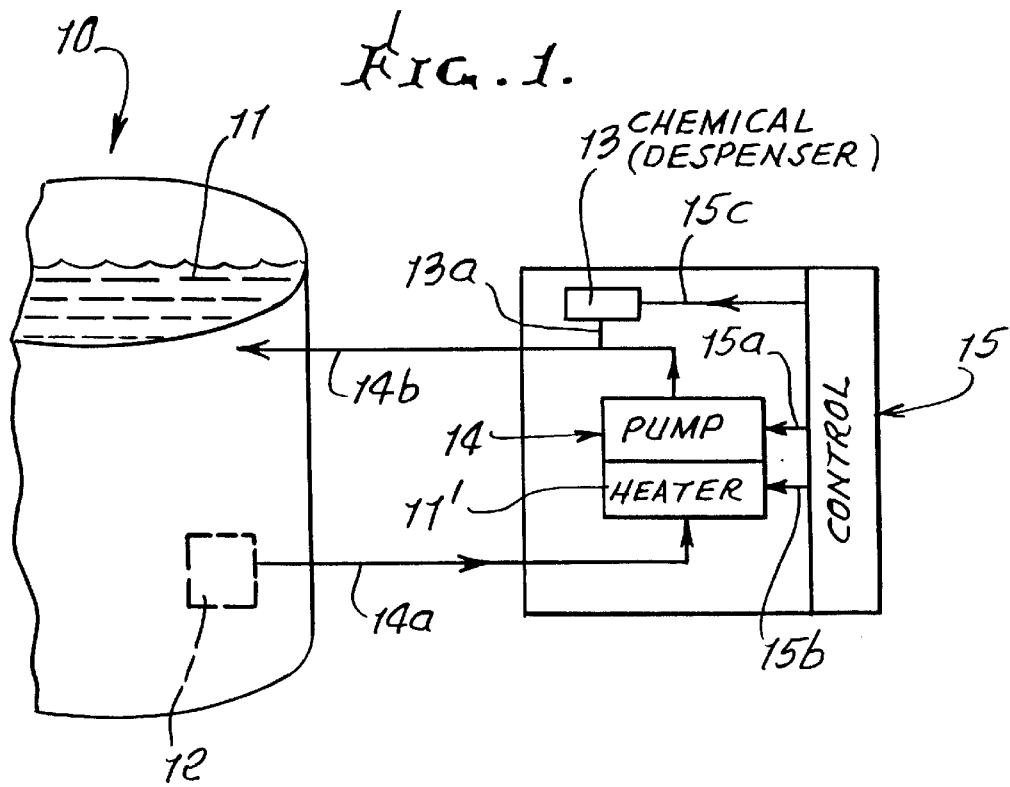
FIG. 1 is a schematic diagram showing a spa water control system.
Figure 1A:
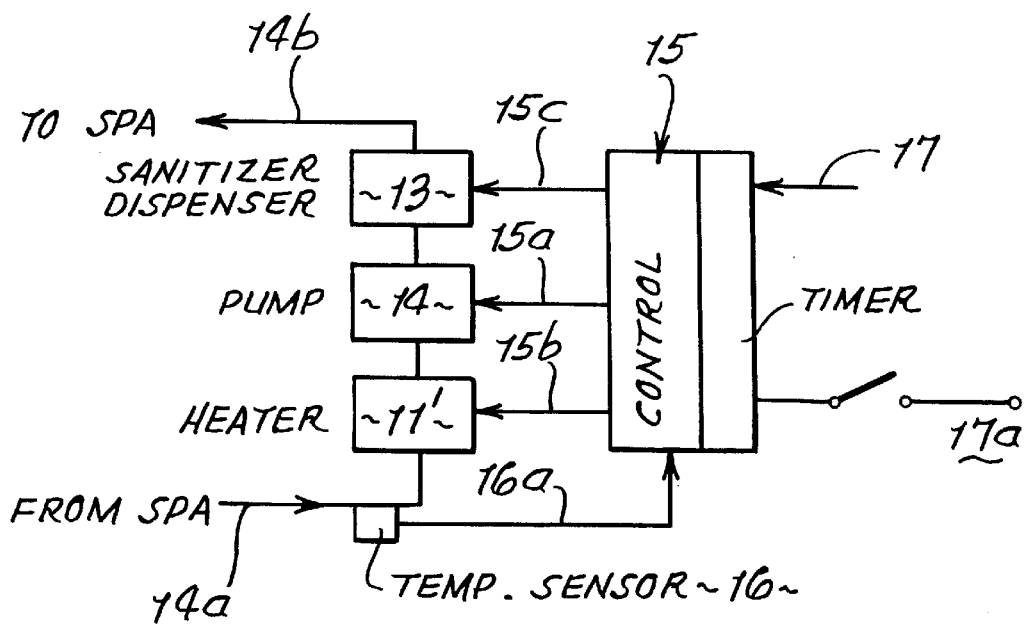
FIG. 1a is a control system diagram.

FIG. 1 schematically shows a hot tub or spa 10 containing water 11 to be treated. Treatment may typically include heating (as by a heater 11'); filtering (as by filter 12 through which water flows); and sanitizing (as by use of dispenser 13 for sanitizing chemicals, as for example chlorine to be added to the water flowing to or from the spa 10. A motor driven water pump 14 operates to withdraw water at 14a from the spa, and return it to the spa at 14b. A control unit 15 is operatively connected at 15a, 15b and 15c, to the pump water 14a to turn the water ON and OFF and thereby control circulation, to the heater 11 to turn the heater ON and OFF in accordance with changes in sensed temperature of the water flowing to the pump; and to the chemical dispenser 13 to control a sanitizer (i.e. to dispense sanitizer at 13a into the water flow, periodically). See also FIG. 1a, showing a water temperature sensor 16 providing a heating control signal at 16a to controller 15.

Definition of water and controllable components are as follows:

A chemical sanitizer is defined as a chemical that has the ability to destroy or control the formation of contaminants. Typical of these are chlorine, bromine, biguanide, ozone, hydrogen peroxide and iodine.

A filter is defined as a device used to remove particulate from water by several means, including but not limited to pressure, vacuum, evaporation, or osmosis. Typical of these are fine mesh of varying materials and construction, sand particles, plastic particles, chemical particles, charcoal particles, reefing systems, coagulants, skimmers or vacuums.

A filtration system is defined as a device that incorporates a filter.

Additional water treating components that can be used are defined as follows:

An ozonator is a sanitizing system that creates ozone. Typical of these are an Ultra-Violet (UV) bulb, microchip or corona discharge (CD) chamber that produces varying amounts of ozone.

An ionizer is a sanitizing system that adds, either electrically or chemically, ions or halogens to the water via chemical or electrical reactions. Typical of these are electrolytic plates, copper and silver plates, stainless steel balls or plates and charcoal grids.

A predetermined or initially computed time for the cyclic operation of a filtration or sanitation system as at predetermined intervals is input at 17 into the control. The control then stores this information for reference and use. The system as at 17a is initially activated when power is introduced to the system. A default setting, input by the manufacturer, will be the operational condition unless superceded by manual input or internal computation.

There are several means by which a filtration or sanitation system will operate during time periods when the spa, hot tub or pool is not being used. During such timewise spaced periods of operation, the filtration or sanitation system is operating, not as or for it's primary purpose, but as a secondary operation, concurrent to another programmed, automatic or required function. Typical of these are thermostatic controls, solar powered operation, circulation systems, automated vacuums, automatic leveling devices or spa covering devices.

Upon completion of a predetermined time period, the control compares the total run time of all systems that either directly or indirectly control or operate the filtration or sanitation system. The aforementioned predetermined time limit of cyclic filtering is initially input by the manufacturer, unless superceded by manual input or internal computation.

If the time limit of filtering (during pump operation as for example two fifteen minute periods of filtering over a 24 hour period), is met or exceeded, (as for example by additional filtering during operation of water heating equipment) the next set filtration or sanitation cycle is bypassed for that next time period, and a new comparison interval is initiated.

If the time limit is not met, the system will either operate for the entire pre-set time period, or for the remaining time difference between the two, or for a computed percentage of the original value. This is based on the application, usage, versatility of the control being employed or a number of other factors or constraints.

The control system can be utilized on newly designed or pre-existing apparatus. Various methods for sensing or measuring operation of the filtration or sanitation system can be employed. Likewise, the methods of connection to and means of controlling such systems can vary upon design and material construction and usage. However, none of the aforementioned connections, or sensing or operating constraints limit the scope of the described system or its accompanying design, description or applicable logical control.

EXAMPLE

Figure 5:
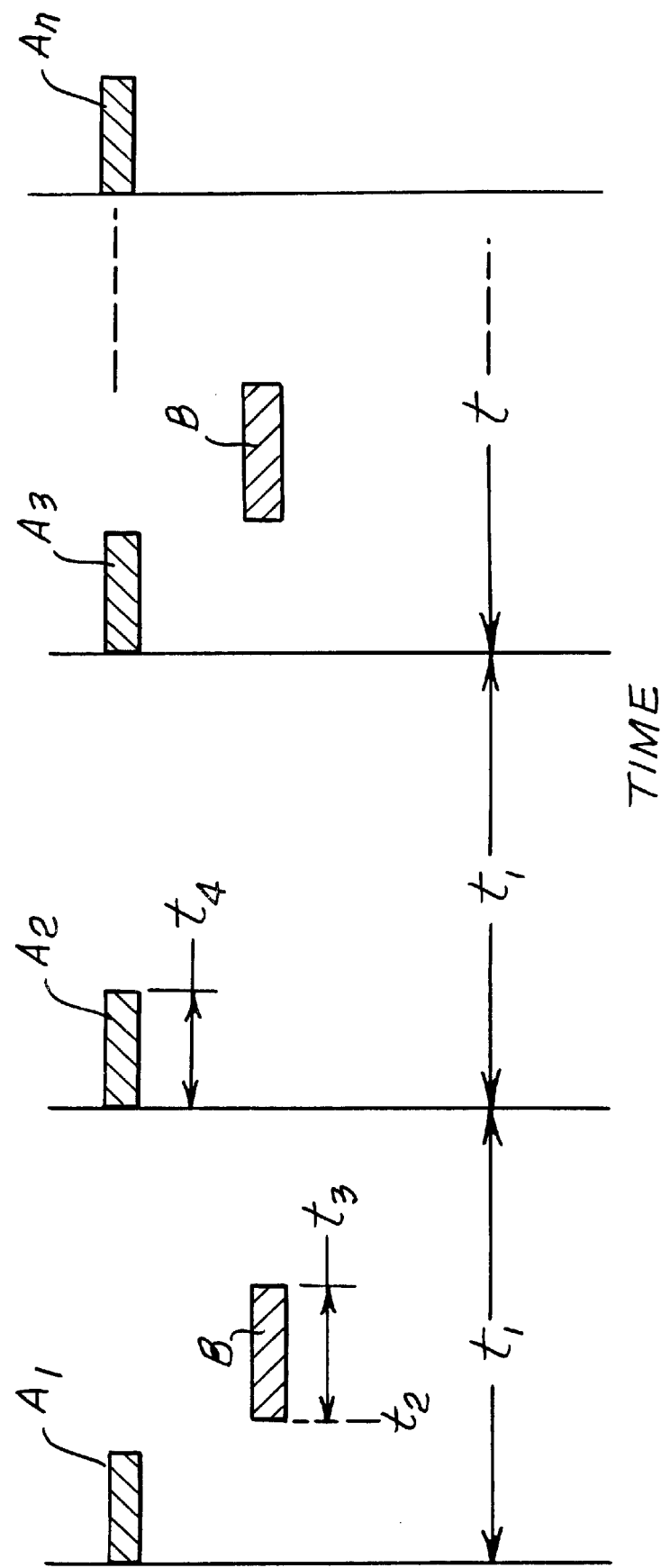
FIG. 5 is a timing sheet summary.

Referring to FIG. 5, it shows timewise spaced cyclic intervals $A_1, A_2, A_3-A_n$ of water filtration, during which the spa water pump 14 is operating to circulate water in or through the hot tub or spa 10. Such intervals are typically set. Typically, the circulating water passes in heating relation with the water heater 11; and, when the heater is ON, the flowing water is heated. The water is turned ON or OFF by control circuitry 15 which responds to the spa water temperature sensor 16, as in thermostatic relation, to keep the water in the spa within acceptable temperature limits. A water filter 12 also operates to filter the water as it circulates (see path 14a in FIG. 1).

The water pump is typically programmed to operate during timewise spaced or set cyclic intervals, shown for example at $A_1, A_2-A_n$, which are equally spaced apart in time. The time spacing of such intervals is indicated by $t_1$, which may for example be 12 hours. Thus, filtration occurs during equal time intervals $A_1, A_2-A_n$. which may be between 5 and 30 minutes long, for example.

The circulating water heater 11 is or may for example, be operable during time intervals B to heat the water being circulated and filtered, and in response to a drop in water temperature, as referred to above, heating ending when sensed water temperature has increased to threshold level. B may occur timewise simultaneously, in whole or in part, with one or more of $A_1, A_2-A_n$, and may have different time durations, dependent upon water heating requirements, as determined by weather, tub usage, etc.

The invention contemplates that if B occurs at a time $t_2$, as indicated, it means that the pool water is being circulated at that time, which in turn means that water filtration is also occurring at that time. If the duration $t_3$ of B is greater than the duration $t_4$ of a subsequent set filtering cycle, say $A_2$, then this means that the water has already been filtered, during B, by an amount in excess of filtration that would occur in $A_2$, so that when the time arrives for $A_2$ to start, there is no need for $A_2$. This then contemplates the steps:

a) determining said intervals A, $A_2$ and B, and b) reducing or eliminating said cyclic interval $A_2$, as a function of duration of said time interval B.

Therefore, the circuitry in software control 15 provides for $A_1$, B, and controls the pump to eliminate $A_2$ (i.e. not operate to circulate water) if B is sufficiently long in duration (i.e. $t_3 > t_4$) or, if B is less than $A_2$ in duration, (i.e. $t_3 < t_4$) the duration of $A_2$ is controllably reduced (i.e. the pump motor is deactivated) by or for the time duration of B, for example, i.e. the pump operates during the shortened interval ($t_4$–$t_3$) Therefore, since the pump motor operation is reduced, electrical energy is saved.

The same mode of operation occurs for water treatment such as sanitizing, such treatment typically occurs cyclically, during filtration cycles as at $A_1$, $A_2$–$A_n$. Therefore, need for sanitizing is reduced as $A_2$ is reduced, as a function of heater operation B.

Figure 2:
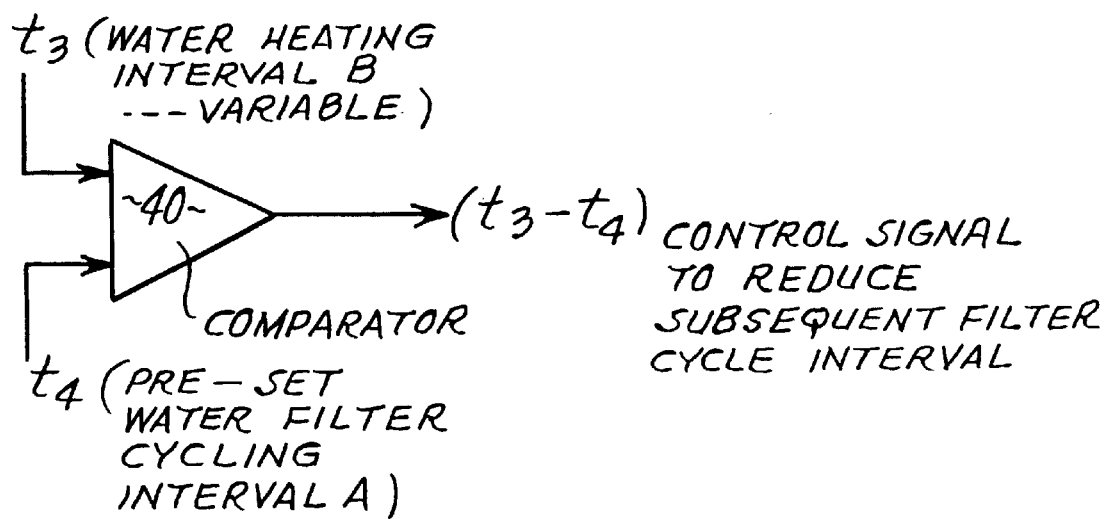
FIG. 2 is a circuit diagram.

FIG. 2 shows a comparator 40 for comparing $t_3$ and $t_4$ where $t_3$ is determined by needed water heating as determined by water temperature sensing at 16.

Figure 3:
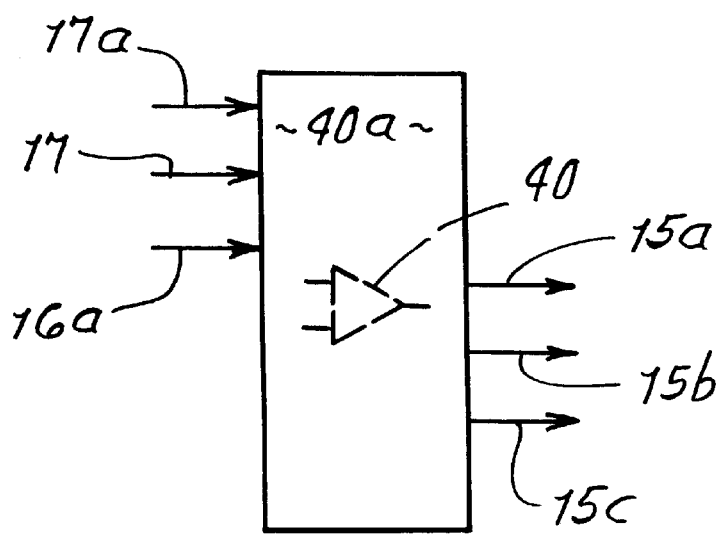
FIG. 3 is a circuit diagram.

FIG. 3 is an overall control circuit 40*a* having input and output, as shown.

I claim:

1. The method of controlling the operation of a spa water treating system, where such treating is selected from the group:
   i) water filtration
   ii) water sanitizing
   iii) water heating
   and that includes the steps:
   a) determining a desired water treating time interval as a function of timing of spa water prior treating interval, or usage,
   b) and treating the spa water as a function of said determined time interval, and including activating and deactivating said treating on a cyclic basis and controlling said activating and deactivating by comparing said interval with the elapsed operating time of related equipment.

2. The method of claim 1 wherein said treating comprises active water filtration.

3. The method of claim 1 wherein said treating comprises active water sanitizing.

4. In operation of a spa or hot tub, the steps that include
   a) establishing filtering cycles,
   b) heating the spa water during a heating interval,
   c) using the heating interval to modify the duration of one or more of said filtering cycles,
   d) said modifying being activated and deactivated on a cyclic basis and being controlled by comparing the heating interval with a prior heating interval.

5. The method of controlling the operation of a water body treating system, where such treating is selected from the group:
   i) water filtration
   ii) water sanitizing
   iii) water heating
   and that includes the steps:
   a) determining a desired water treating time interval as a function of timing of body water prior treating interval, or usage,
   b) and treating the body water as a function of said determined time interval,
   c) said treating being activated and deactivated on a cyclic basis, and said activating and deactivating being controlled by comparing said treating time interval with said prior treating interval.

6. A method of controlling the operation of the filtration system of a spa or other body of fluid, said system including filtration components, said method including, activating and deactivating the filtration system components, on a cyclic basis and controlling the timing of said activating and deactivating by comparing such timing with the elapsed time of operation of related equipment which also incorporates filtration, whereby a required filtration requirement is met while eliminating or reducing need for a subsequent filtration cycle.

7. The method of claim 6 wherein said related equipment includes a fluid heater.

8. A method of controlling the operation of the sanitation system of a spa or other body of fluid said system including sanitizing components, said method including, activating and deactivating of the sanitation system components on a cyclic basis, and controlling the timing of said activating and deactivating by comparing such timing with an elapsed time of operation of related equipment which also incorporates filtration, whereby the system meets required sanitation requirements while also eliminating or reducing need for a subsequent sanitation effecting step.

9. The method of claim 8 wherein said related equipment includes a fluid heater.

10. The method of reducing pump water energy requirement, in a spa water circulation system, wherein the water pump is programmed to operate during timewise spaced cyclic intervals $A_1$ and $A_2$ to effect water filtration by a filter during such intervals, and wherein a water heater is operable for a time interval B to heat the water being circulated and filtered and in response to a drop in spa water temperature, the steps that include
   a) determining said intervals $A_1$, $A_2$ and B, and
   b) reducing or eliminating said cyclic interval $A_2$ as a function of duration of said time interval B.

* * * * *